INVENTOR.
WILLIAM H. GROTH
BY
G. Donald Weber Jr
ATTORNEY.

INVENTOR.
WILLIAM H. GROTH
BY
G. Donald Weber
ATTORNEY.

INVENTOR.
WILLIAM H. GROTH
BY
J. Donald Wilson
ATTORNEY.

INVENTOR.
WILLIAM H. GROTH
BY G. Donald Weber Jr.
ATTORNEY.

United States Patent Office 3,427,595

Patented Feb. 11, 1969

3,427,595

INPUT/OUTPUT BUFFER

William H. Groth, Jr., Framingham, Mass., assignor to Honeywell Inc., Minneapolis, Minn., a corporation of Delaware Filed Nov. 3, 1966, Ser. No. 591,857

U.S. Cl. 340—172.5 8 Claims

Int. Cl. G11b *13/00;* G06f *1/00*

ABSTRACT OF THE DISCLOSURE

There is provided an input/output buffer circuit which includes magnetic cores and semiconductors. The semiconductors and the core operate in a bistable mode to provide controllable storage.

This invention relates to a buffer register which is utilized to temporarily store information in the form of electrical signals. More particularly, this invention relates to a device wherein a magnetic core buffer is connected with a counter circuit and is utilized to selectively transfer information from an input source to a utilization device and vice versa.

There are many applications of electrical input/output devices, especially in electronic computing equipment. These input/output devices can be utilized in digital computers or in analog computers. In many applications, a separate circuit is connected between the input apparatus and the utilization device, while a further circuit is connected between the utilization device and the output circuit. This configuration requires the use of separate input and separate output circuits or devices thereby producing duplication of many of the components in each of the circuits.

In this invention, input information, which may be supplied by an electronic computer, is supplied via the input/output circuit to a utilization device. The utilization device may ultimately be a process control apparatus or the like. In addition, the utilization device may provide output information therefrom via the input/output circuit to the original input device or computer whereby this information may be operated upon to generate further, e.g. updated, information. This further information may then be presented to the input/output circuit and utilized as input information which is to be provided to the utilization device. This method of operation may continue through as many cycles as is necessary and/or desirable. That is, in process control, for example, the process variables may be continuously sampled and updated by means of this general concept. The specific device described herein provides one segment of the control for an overall supervisory system.

Thus, it may be seen that the circuit which is the subject of this invention is provided in order to permit the utilization of a single circuit to perform the input and the output interfacing between a particular utilization device and a particular operating device. The utilization of a single input/output circuit clearly permits a reduction in the number of components which are required to perform the input/output function. Moreover, this circuit permits direct digital control of analog or digital processes by means of an electronic computer or the like.

The objects and advantages of this circuit will become more readily apparent when the following description is read in conjunction with the following drawings, in which.

Figure 1:
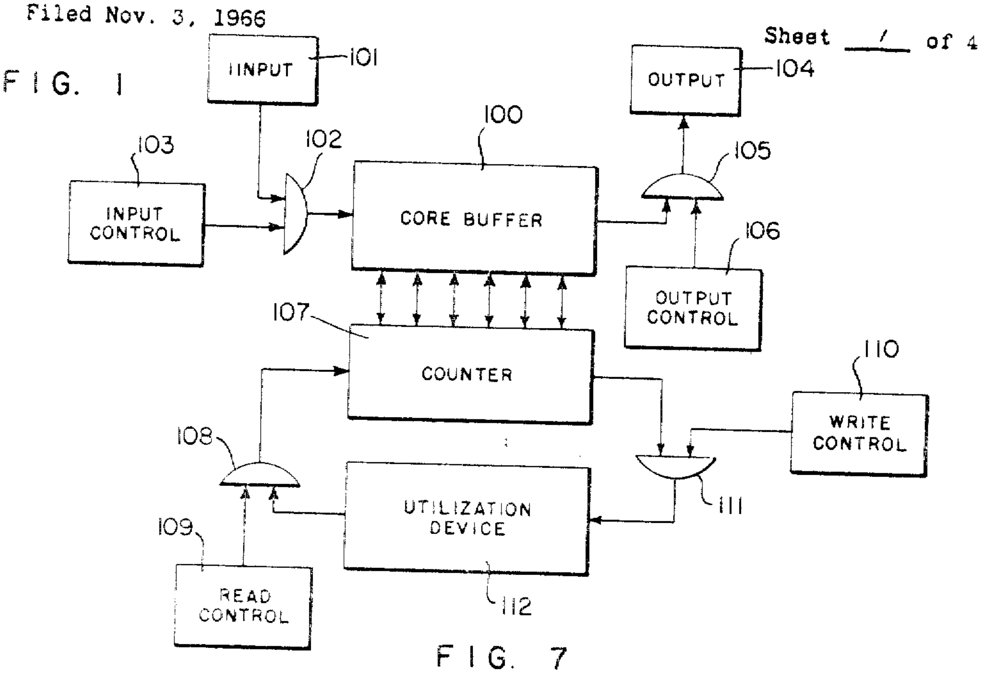
FIGURE 1 is a block diagram of the subject input/output device in a simplified system.

Referring now to FIGURE 1, there is shown a logical block diagram of the instant invention. A magnetic core buffer 100 is connected via gate 102 to input device 101. Input device 101 may be, for example, a digital computer which provides input information in the form of electrical signals. The information provided by input device 101 is produced in accordance with internal programming and, therefore, the operational procedures which are set up therein. Input control device 103 is also connected to gate 102. Thus, information from input device 101 cannot be passed to core buffer 100 via gate 102 unless the proper control signals are supplied by the input control device 103. This control arrangement eliminates the possibility of core buffer 100 erroneously storing and/or receiving information from input device 101 when an output operation is being carried out.

Also connected to core buffer 100, via gate 105, is the output device 104. Output device 104 may similarly be a digital computer. In fact, input device 101 and output device 104 may be sections of the same computer or similar supervisory control device. As in the case of the input apparatus, an output control device 106 is connected to gate 105. Thus, information cannot be transferred from core buffer 100 to output device 104 via gate 105 without the application of the proper control signals from output control device 106. This arrangement prevents erroneous readout from core buffer 100. It should be clear that the control devices 103 and 106 may form a portion of the supervisory control device (e.g. computer) or, at least, be controlled thereby.

Connected to core buffer 100 is counter 107. The counter may be any typical counter comprising a plurality of typical circuits, for example solid state flip-flops, which are known in the art. The plurality of inputs connecting core buffer 100 and counter 107 are indicative of parallel information transfer therebetween. Of course, with proper modifications the information transfer between the buffer and the counter may be serial in nature.

Connected to counter 107, via gates 108 and 111, is the utilization device 112. In the case of gate 111, information is passed from the counter to the utilization device via the gate. However, gate 111 passes information therethrough only in response to the application of a proper control signal via the write control device 110. In the case of gate 108, information is transferred from the utilization device to the counter via gate 108 only with the application of the proper control signal by read control device 109. Again, read and write control devices 109 and 110 may form a portion of, or be controlled by, the aforesaid supervisory control device.

In operation, information is transferred (in serial or parallel) from input device 101 to the core buffer 100 in response to the appropriate signal by control device 103. The information is stored in the core buffer and in response to the appropriate drive signals (see infra), transferred to counter 107. Upon the application of the proper write control signals, the information stored in counter 107 is transferred to utilization device 112. Here the information may be utilized in any desired manner. For instance, in a process control application, an analog-type valve may be operated or the like.

Similarly, upon the application of the proper read control signals, the information in utilization device 112 (which may be different than the input information) is transferred to counter 107 and, thence, into the core buffer 100 via the respective gates. Upon the application of the proper control signals, the information stored in buffer 100 is transferred via gate 105 to the output device 104. Thus, the instantaneous condition may be related to the supervisory control device for updating and operation.

The principle of the operation is that information from the input device 101, for example a digital computer, is supplied to the core buffer in terms of digital information whereby DDC operation may be effected. This digital information may be transferred in serial or parallel fashion. This information is transferred to the counter 107 by suitable control signals (see infra). The digital information in the counter is then transferred to the utilization device which may include an incremental digital to analog converter device such as is described in the copending application of William H. Groth, entitled Electrical Apparatus bearing Ser. No. 497,369, and assigned to a common assignee. The utilization device may then perform the desired function, as for example supplying an analog signal to a process control device, or the like, to correct (or otherwise alter if necessary) the instantaneous operation thereof.

Subsequently, the utilization device 112 samples the aforesaid analog device (not shown) by any well known and suitable method for example, and thereby determines and detects the instantaneous condition thereof. This analog-type information is digitized and then transferred to counter 107 via gate 108 from where it is transferred to the core buffer 100. Upon the application of the proper control signal, the information stored in the buffer is then transferred via gate 105 to output device 104, for example a digital computer. This information is then operated upon by the output device in accordance with the internal programming thereof. Output device 104 may be a computer whereby further information is generated which is more up-to-date relative to the process being controlled. This updated information may then be applied, via input device 101, to core buffer 100 and the operation recycles. Thus, control of a process which is monitored and/or controlled by utilization device 112 is varied, as necessary, in accordance with input information. In addition, the condition of output device 104 can be sampled directly whereby suitable use of this information may be made.

Figure 2:
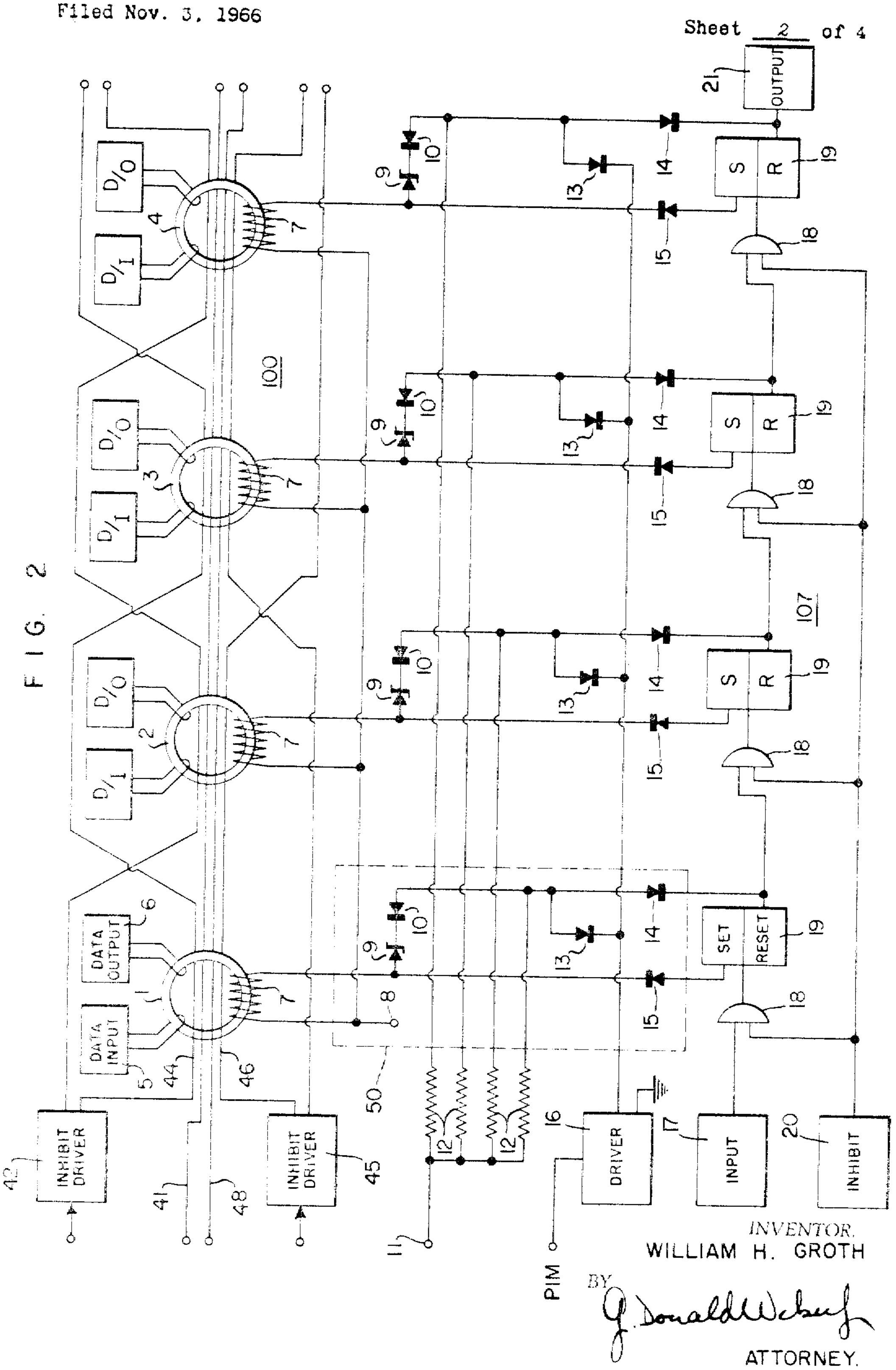
FIGURE 2 is a schematic diagram of the core buffer and the associated counter, as well as the pertinent control circuitry, which is shown in FIGURE 1.

Referring now to FIGURE 2, there is shown a more detailed schematic diagram of the circuitry included in the core buffer 100 and the counter 107. The core buffer is similar to a core buffer which is known in the art and which is described, for example, in the copending application of Wallace B. Jakacki et al., now U.S. Patent 3,351,911, entitled Interfacing System, and assigned to the common assignee. However, the configuration of the core buffer of the instant invention permits the utilization thereof as an input/output device.

More particularly, in FIGURE 2 there are shown magnetic cores 1, 2, 3 and 4. The number of cores which may be utilized is not to be limited by this description or drawing which are for purposes of explanation only. Linked to each of the cores 1–4 is a data input device 5 which is similar to input device 101 and the associated control shown in FIGURE 1. The input devices 5 may be separate devices or form portions of a single computer, for example. Also connected to each of the magnetic cores 1–4 is a data output device 6 which is akin to the output device 104 and associated control elements shown in FIGURE 1. Again output devices 6 may be separate components or form a portion of an overall control system. An inhibit driver 42 is coupled to alternate ones of the magnetic cores via conductors 43 and 44, respectively.

Since the conductors 43 and 44 are coupled to alternate cores, operation of selected ones of the cores is provided. Similarly, inhibit driver 45 is coupled to conductors 46 and 47 which are coupled to magnetic cores 1–4. However, the wires 46 and 47 are coupled to alternate pairs of cores thereby to provide further selection of the cores which are to be operated upon. Additional drivers and/or conductors may be utilized to provide more selectivity in large core systems. That is, using coincident current techniques, only certain cores are fully energized or operated upon in response to selective inhibit driver signals.

Also linking each of the cores 1–4 is the drive line 41 and the redrive line 48. These conductors are provided in order that separate signals may be applied thereby which signals are effective to selectively create magnetic flux in opposite directions in the cores. For example, a drive current may be provided along conductor 41 from left to right (e.g. a positive pulse) while the redrive current may be provided on conductor 48 from right to negative (e.g. left pulse). Thus, the core is set and reset in accordance with known magnetic operations of cores having substantially rectangular hysteresis characteristics. Of course, a single drive line may be utilized whereby a single bipolar pulse is generated therealong. The manner of selecting and driving the cores is not a part of this invention per se.

Also linked to each of magnetic cores 1–4 is a sense winding 7. The sense winding may have a large turns ratio (for example 10:1) relative to the data input and data output windings. One terminal of sense winding 7 is connected to a potential source represented by terminal 8. Typically, a suitable potential source may supply a substantially constant potential, for example +1.3 volts. Another terminal of each of sense windings 7 is connected to the anode of a separate Zener diode 9. The cathode of each Zener diode 9 is connected to the cathode of a separate rectifier diode 10. The anode of each rectifier diode 10 is connected to the anode of a separate rectifier diode 13. The cathode of each rectifier diode 13 is connected to a driver circuit 16. In addition, each connection between the anodes of rectifier diodes 10 and 13 is connected by a separate current limiting impedance 12 to a potential source represented by terminal 11. Typically, potential source 11 is capable of supplying a substantially constant potential, for example +48 volts.

Also connected to the anode of Zener diode 9 and the second terminal of sense winding 7 is the cathode of rectifier diode 15. The anode of rectifier diode 15 is connected to one of the inputs of flip-flop 19. In the configuration shown, this input is termed the Set input. The junction between the anodes of rectifier diodes 10 and 13 is also connected to the anode of rectifier diode 14. The cathode of rectifier diode 14 is connected to one output (e.g. the Reset output) of flip-flop 19. The plurality of flip-flops 19 form the bistable stages of a counter such as counter 107 of FIGURE 1.

The toggle input of each flip-flop 19 is connected to a gate 18. One input to each gate 18 is provided by the inhibit source 20 which is capable of supplying a signal which normally inhibits the operation of the gates 18. The inhibit signal supplied by source 20 is selectively removed whereby gates 18 are enabled. Another input to gate 18 associated with the first flip-flop 19 stage of the counter is supplied by input device 17 which may be any suitable means for supplying, in serial fashion, inputs to the counter. In the case of the subsequent gates 18, a second input is supplied by the Reset output of the immediately preceding flip-flop 19. The last flip-flop provides an output signal on the Reset output terminal to an output device 21 which is any suitable means capable of utilizing such an output signal. The details of the control of the flip-flops 19 and the like are not shown in this drawing in order to preserve clarity. Such logical detail is described hereinafter.

Figure 3:
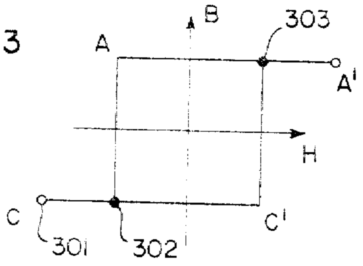
FIGURE 3 is a diagram of the substantially rectangular hysteresis characteristic for the cores shown in FIGURE 2.

Before describing the operation of the circuit shown in FIGURE 2, it is considered desirable to refer to FIGURE 3 and to discuss the operation of the magnetic cores in terms of the hysteresis characteristic shown. It is readily apparent, from FIGURE 3 that the cores exhibit a substantially rectangular hysteresis loop. Magnetic cores exhibiting this characteristic are known in the art. However, a brief description thereof will indicate that such cores exhibit saturated magnetic regions represented by the substantially horizontal lines A–A′ and C–C′. The unsaturated magnetic regions of operation are designated by the lines A–302 and C′–303. Thus, in a serial operating condition, little or no energy is expended by a signal in driving the core along a horizontal axis for example, from point 301 to point 302 or the (C–C′ axis). Conversely, energy is expended in driving the core along a vertical axis as, for example, from the point C′ toward the point 303.

The corollary to this operation is that in parallel operation the application of the signal to one winding which drives the core along either of the horizontal axes is ineffective to create a flux change in the core and therefore, will not produce a signal in a parallel winding on the core. However, driving the core from point C′ toward point 303 will generate a flux change in the magnetic core thereby producing a signal in the parallel windings. Therefore, it is typical, in the operation of magnetic cores, to selectively bias the core in the extreme negative saturation region, for example, whereby the application of a drive signal will merely drive the core in the negative saturation (or horizontal axis) region. Thus, an output signal in a parallel winding will not be generated. When the core is not so biased, the drive signal is sufficiently large to drive the core in the unsaturated region. This operation causes a magnetic flux change in the core and an output signal is generated in the parallel winding. This operation is utilized in the core buffer of the instant device.

In operation, the inhibit drivers 42 and 45 produce the necessary signals to select the cores which are to be rendered operative or inoperative as the case may be. In addition, a signal is applied via data input device 5 to the associated core wherever information is to be stored. This input has the effect of inhibiting the core to which it is applied. Thus, for example, a core may be driven to negative saturation as represented by point 301 as shown in FIGURE 3. In response to the subsequently applied drive signal, the inhibited core is driven from point 301 past point 302 along the hysteresis characteristic toward point C′. Inasmuch as the core is driven in the saturated region, there is no substantial flux change therein. Therefore, no output signal is developed across the windings linking the core. Similarly, when the redrive signal is applied on conductor 48, the core is driven past point 302 to point 301 along the hysteresis characteristic. Again, no flux change is detected and, therefore, no signal is developed across the windings around the core.

In the alternative condition, namely wherein a signal is not produced by the data input device 5, the core normally resides at the point 302 of the hysteresis characteristic. With the application of the drive signal along conductor 41, the core is driven, via knee C′, from point 302 to point 303 (and perhaps beyond) along the hysteresis characteristic. Clearly, there is a substantial flux change when the core is driven along the vertical portion of the hysteresis characteristic between knee C′ and point 303. Because of this large flux change, a signal is generated in the windings linking the driven core. Conversely, when the redrive signal is applied along conductor 48, the core is driven from point 303 to point 302 via knee A along the hysteresis characteristic. Again, a substantial flux change occurs whereby a signal is generated in each of the windings linking the core. Thus, it is seen that, according to the code utilized, the application, or not, of a signal by a data input device 5 is effective to cause at least temporary storage of information in the associated core in the buffer.

The information in the core buffer 100 is transferred to the counter 107 via the diode gating arrangement connected between the sense winding 7 and the counter. This gating arrangement is generally shown as gate 102 in FIGURE 1. More particular, a negative going set pulse produced in winding 7 by the drive signal (line 41) is supplied to the Set side of the associated flip-flop 19. That is, the positive signal produced in winding 7 by the redrive signal (line 48) is cutoff by diode 10 which is reverse biased thereby. The low level or negative going signal produced by the drive signal is insufficient to drive the Zener diode 9 in the reverse direction to the breakdown potential. Therefore, the negative going set signal is applied, via diode 15, to the Set side of the associated flip-flop 19. This signal sets the flip-flop 19 such that the Set output (shown unconnected) would be a high level signal while the Reset output is a low level signal. The low level signal at the Reset side of flip-flop 19 is applied as an input to the succeeding gate 18′ and is capable of transferring a signal through the gate when the necessary signals are applied thereto. Thus, it is seen that the data input devices 5 selectively store information (albeit temporarily) in the associated magnetic cores or elements by applying an inhibit signal thereto. The information stored in the respective cores or elements is transferred to the associated flip-flops in the counter in response to the application of the drive and redrive signals to the cores. The information stored in the counter is available to the output device 21 or any other suitable serial or parallel output device as may become relevant hereinafter.

In the converse operation, information is provided by input device 17 and stored in the counter by shifting the information along the counter stages in a known fashion. The information thus stored may be transferred to the magnetic cores. This information transfer is controlled by the respective flip-flop 19 and the driver 16. Thus, in the mode of operation wherein the flip-flops control the magnetic cores, inhibit signals are not produced by inhibit drivers 42 and/or 45. However, the output signal provided by driver 16 switches to a positive level.

More particularly, in the former operation mode previously described, driver 16 provided a low level signal. Thus, the current produced by potential source 11 passed through resistor 12, diode 13 and driver 16 to ground or other suitable reference potential. In addition, the Zener diode 9 decoupled the driver 16 and the potential source 11 from sense winding 7. However, in the present mode of operation, the high level signal provided by driver 16 reverse biased diode 13 whereby this current path is unavailable. Consequently, the current path connected to resistor 12 is determined by the condition of the associated flip-flop 19. For example, if flip-flop 19 is in the Set condition, the Set output signal exhibits a high level and the Reset output signal exhibits a low level. Consequently, diode 14 is forward biased and a current path exists from source 11 to the reference potential source included within the flip-flop 19 via resistor 12 and diode 14. On the contrary, if the flip-flop 19 is in the Reset condition, the Set output signal exhibits a low level and the Reset output signal exhibits a high level. Consequently, diode 14 is reverse biased and, ideally, no forward current exists therein. Therefore, the current path is changed whereby current flows from source 11 though resistor 12, rectifier diode 10 and is sufficient to cause reverse breakdown of Zener diode 9 whereby current flows through sense winding 7 to source 8. The sense of winding 7 as well as the direction of current flowing therethrough is designed to provide an inhibit signal to the magnetic core.

Thus, with the application of the drive and redrive signals, the core is driven (or not) in accordance with the previous history, viz whether or not an inhibit signal was applied via sense winding 7. If an inhibit signal was not applied to winding 7, flip-flop 19 will have resided in the Set condition. Consequently, the drive and redrive signals will produce flux changes in the magnetic core which flux changes produce signals in sense winding 7.

The negative going portion of the signal produced in sense winding 7 is passed through rectifier diode 15 to the Set input of flip-flop 19. However, inasmuch as flip-flop 19 was initially in the Set condition, the newly applied input signal is ineffective to produce any changes. In the converse situation, viz, an inhibit signal was applied to the cores via sense winding 7, flip-flop 19 will have been in the Reset condition. Since the associated core is inhibited, the drive and redrive signals will not produce output signals in sense winding 7. Since no output signals are produced in winding 7, no signal is applied to flip-flop 19. Therefore, flip-flop 19 remains in the Reset condition.

It should also be noted, that the information transfer is effected by this procedure. Thus, if the associated magnetic core is not inhibited, the drive and redrive signals will produce the aforementioned flux changes which flux changes link the windings associated with the data output device 6. If the associated core has been inhibited, there will be no flux changes whereby there will be no signal generated on the output windings associated with output device 6. Therefore, it is seen that the output signal detected at output device 6 is, in fact, directly controlled by the condition of the associated flip-flop when the device is in the output mode in accordance with the control signals supplied by driver 16. In addition, it is seen that this information transfer is non destructive in that the condition of the flip-flops is not altered.

Figure 4:
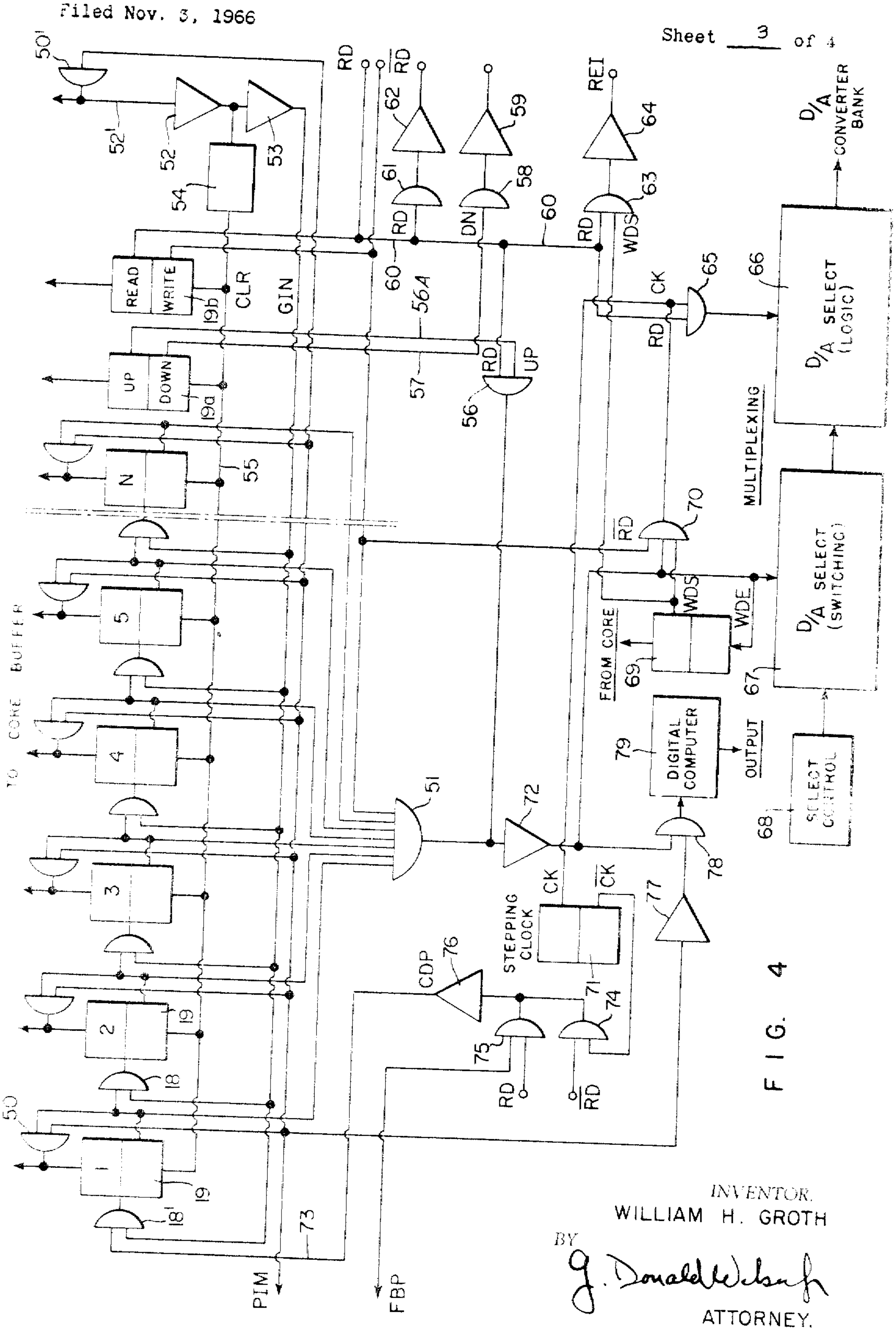
FIGURES 4 and 4A are logical block diagrams showing the details of the logical circuitry and control of the subject input/output circuit, including optional multiplexing arrangements for multiple digital to analog converters.
Figure 5:
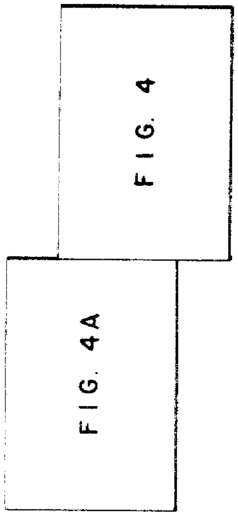
FIGURE 5 is a block diagram showing the relationship between FIGURES 4 and 4A.
Figure 4A:
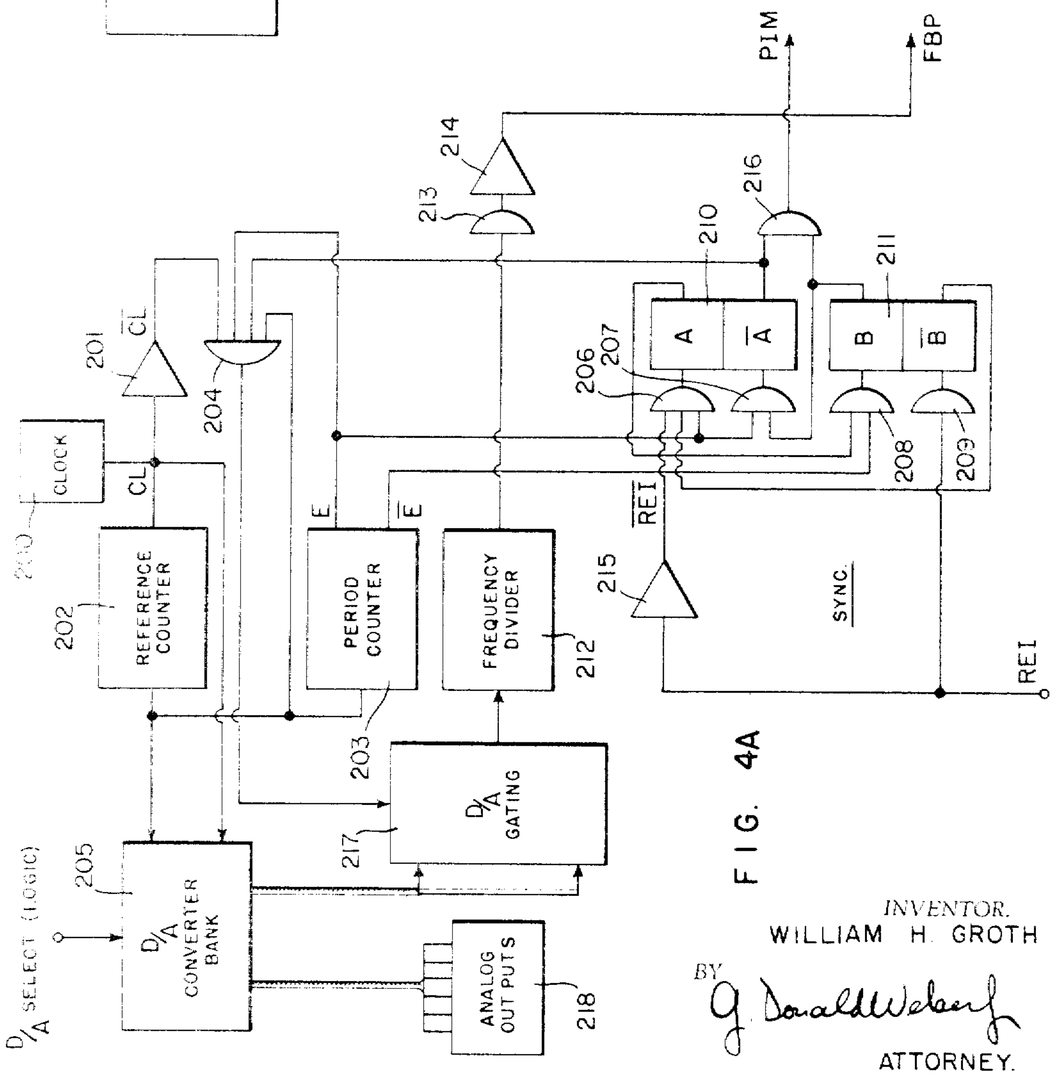

Referring now to FIGURES 4 and 4A, there are shown more detailed schematic diagrams of the instant circuits. In addition, FIGURE 5 is a diagramatic showing of the inter-relationship of the circuits shown in FIGURES 4 and 4A.

Referring to FIGURE 4, there are shown a plurality of gates 50, each of which is connected to a different one of the cores shown in FIGURE 2. The connection is effected at the junction between sense winding 7 and the cathode of diode 15. Each of gates 50 is also connected to an associated flip-flop 19. The plurality of flip-flops 19, of which five are shown, comprise stages of the counter 107 shown in FIGURE 1. Of course, the counter may include any desired number of stages. As will be seen, flip-flops **19*a* and 19*b* are not connected to gates 50. Flip-flops 19*a* and 19*b*, which may be similar in configuration to flip-flop 19 are connected directly to the associated core in the core register. Likewise, the gate 50′ is similar to the gate 50 but not directly connected to a flip-flop, as is the case for gates 50. Rather, gate 50′ is connected to the circuit elements 52, 53 and 54. Element 54** is an inverting, differentiating network which produces a signal having a predetermined duration, for example two microseconds, in response to the application of an input signal. In the preferred embodiment, the network operates on the leading edge of the input signal to produce a pulse which persists for the desired time interval.

The elements 52 and 53 comprise typical inverter elements or networks. Thus, a read signal applied by the associated core line 52′ is inverted by inverter 52 and applied to circuit element 54. Circuit element 54 produces a signal having a predetermined duration as noted supra. The signal produced by circuit element 52 is also applied to inverter 53 and reinverted thereby. Thus, in the preferred embodiment, a signal having a duration of five microseconds, for example, is applied to line 52′ by the associated core. After the double inversion, a signal (substantially identical to the input signal) having a five microsecond duration is produced by inverter 53. In addition, a signal having a duration of approximately two microseconds is supplied by differentiating element 54. The signal produced by differentiating element 54 is applied as a clear signal (CLR) along conductor 55 to each of the flip-flops 19, as well as the flip-flops **19*a* and 19*b*. The output signal provided by inverter 53 along conductor 56 is the gate inhibit signal (GIN) and is applied to an input of each of the flip-flop input gates 18 as well as gate 18′**.

As is inherent in the designation of the signals, the clear signal (CLR) is applied to each of the flip-flops 19 to clear the contents thereof in order to avoid the insertion of spurious information therein during a transient switching operation. That is, the CLR signal operates as a clamping signal which drives flip-flops 19 to a predetermined operating condition whereby the inadvertent application of a spurious input is not effective. The gate inhibit signal (GIN) is applied to the inputs of the interstate coupling gates 18 to inhibit these gates during the transient switching operation. That is, the application of the GIN signal inhibits the operation of each gate 18 whereby a signal cannot be passed thereby. Thus, a CLR signal operates to control the flip-flop condition such that a spurious signal may not be introduced therein when the leading edge of the GIN signal or the like is applied to the associated interstage coupling gate 18. In addition, the GIN signal prevents the application of any signal to the flip-flop via gate 18.

The output of each interstage coupling gate 18 is connected to a toggle input of each of the counter flip-flops 19. The flip-flops **19*a* and 19*b*, which have specialized functions, do not have interstage coupling gates associated therewith, but are independently controlled by the associated core. An output of each of the counter flip-flops 19 is taken from one side and applied to each of the coupling gates 18. An output from each of the flip-flops 19 is also connected to an input of gate 51. In the preferred embodiment shown, the aforesaid outputs are taken from the same side of the flip-flop, e.g. the Reset side. As will be described hereinafter, gate 51 is an AND gate which produces an output signal only when signals are produced which indicate that each and every flip-flop 19 is in the Reset or zero condition. In the alternative, gate 51 may be connected to the Set or one side of the flip-flops 19 and be indicative of this condition of all of the flip-flops. The output signal from gate 51 (as well as gate 56) is supplied to inverter 72** which produces the output signal WDE which is described more particularly hereinafter.

Flip-flop **19*a* is the up-down flip-flop which controls the reading operation when in one condition and the multiplexing operation when in the other condition. For example, when flip-flops 19*a* provides the UP signal along line 56A to gate 56, gate 56 may be selectively enabled. However, when the flip-flop is in the other condition and supplies the DN signal along line 57 to gate 58, gate 58 is enabled and provides a signal to the network element 59 which may be an inverter circuit. Inverter 59 applies an output signal which controls the counting operation as well as the multiplexing operation as will appear hereinafter. In addition, inverter 59** (as well as most of the other inverters shown) provides a "driver" function whereby the signal produced is not an extreme load on the input device. By inserting the inverters where shown, isolation between various circuit branches is also achieved.

Flip-flop **19*b* is the read-write flip-flop which provides signals which permit reading or writing operations exclusively. More particularly, the read signal RD indicates that a reading operation is being effected wherein signals are transferred from the D/A converter to the counter comprising flip-flops 19. The write signal $\overline{RD}$ indicates that a writing operation is being effected wherein signals are transferred from the aforesaid counter to the D/A converters. In one condition, flip-flop 19*b* provides the read signal (RD) along line 60 to the gates 61, 63 and 65. The read signal which is applied to gate 61 generates a signal which is applied to network element 62 which may be an inverter network. The output signal provided by inverter 62** is applied to the digital-to-analog converter network hereinafter described to inhibit the operation thereof during the read cycle. Clearly, the RD signal could logically produce the desired result. However, the practical reasons for the suggested arrangement, viz., utilizing the inverter circuit, are noted supra.

The read signal RD which is supplied to gate 63 produces an output therefrom only when the signal WDS (hereinafter described) is concurrently applied thereto. An output signal from gate 63 is applied to network element 64, which may be an inverter and produces the output signal REI. This signal, as hereinafter described, is applied to the synchronization network (SYNC) of FIGURE 4A to control the operation thereof.

The read signal, RD, is also applied to gate 65. The concurrent application of a clock signal CK and read signal RD produces an output from gate 65 which is applied to the D/A select (logic) circuit 66. The D/A select (logic) network 66 is connected to the output of the D/A select (switching) network 67. The select control means 68 is connected to the D/A select (switching) network 67 and provides inputs thereto. The select control means 68 is the overall selection scheme, such as a plurality of cores or the like, which is utilized to control and provide a supervisory control function relative to the select circuit 67. These cores, for example, may be controlled by a suitable means such as a computer or the like. The select circuit 67 may include a plurality of flip-flops or the like. The flip-flops are controlled and selected in the same manner as are counter flip-flops 19. The flip-flops in network 67 will determine the output operation of D/A network 66. That is, select circuit 66 may comprise a plurality of gates which are selectively rendered operable by the signals applied thereto by the flip-flops of network 67. The outputs from D/A select circuit 66 are applied to inputs of the D/A converter bank 205 shown in FIGURE 4A. Converter bank 205 comprises a plurality of D/A converters, for example twelve, which may be selected by the D/A select networks. The outputs from D/A converter bank 205 are applied to feedback control circuit 217 for selective processing.

The multiplexing network comprising circuits 66, 67, 68, 205 and 217 is necessary only in the event that a plurality of D/A converters are connected to be controlled by the circuitry comprising the invention. If a single D/A converter is utilized, certain of the multiplexing circuits may be eliminated and only individual enabling or energizing signals need be provided by the circuit.

Additionally, the read signal, RD, is applied to one input of gate 75. Another input to gate 75 is signal FBP (i.e. the feedback signal) which is produced by the feedback portion of the D/A converter circuit. With the concurrent application of the RD and FBP signals, gate 75 is enabled whereby the signal CDP is produced by inverter 76. The CDP signals are applied to the counter 107.

In the other condition, flip-flop 19*b* provides the write signal $\overline{RD}$. This signal is supplied to gate 51 to provide one of the inputs thereof. In the absence of the $\overline{RD}$ signal (i.e. the RD signal is provided), gate 51 is not enabled. In addition, the $\overline{RD}$ signal is supplied to gate 70 as an input along with the signals WDS and WDE which, when supplied concurrently, enable gate 70. When gate 70 is enabled, clock 71 is inhibited. The $\overline{RD}$ signal is also applied to one input of gate 74. Another input to gate 74 is supplied by the $\overline{CK}$ signal produced by stepping clock 71. The concurrent application of input signals $\overline{RD}$ and $\overline{CK}$ enables gate 74 whereby signals (e.g. $\overline{CK}$ pulses) are applied to inverter 76. The signals supplied to inverter 76 are inverted and produce the CDP signals which are applied as inputs to gate 18′ which is associated with the counter 107.

Also associated with the aforementioned multiplexing control circuitry is the flip-flop 69 which may be similar to any of the other flip-flops described. Flip-flop 69 has a control input supplied thereto, for example by an associated core which may be included in a control computer. The WDE signal is also supplied thereto from inverter 72 to selectively clamp the Reset or "zero" side of flip-flop 69 to ground. The output from the Set or "one" side of flip-flop 69 provides the WDS signal to one input of gate 63.

As noted supra, gate 63 produces the REI signal when the WDS signal is applied concurrently with the read signal (RD). In addition, the WDS signal is supplied as an input to gate 70. The output of gate 70 is connected to the CK output of the clock flip-flop 71, hereinafter described, as for example at an input to gate 65. The function of this connection is to selectively clamp the clock 71 output to ground potential thereby effectively inhibiting the clock signal outputs CK and $\overline{CK}$. Since gate 70 is an AND gate for high level input signals, a low level (or ground potential) signal is normally supplied thereby such that clock 71 is inhibited. On the contrary, the clock signal can be produced by stepping clock 71 only with the concurrent application of the signals $\overline{RD}$, WDE and WDS to gate 70 whereby the output signal produced by gate 70 is not a low level signal. As noted, the $\overline{RD}$ signal is produced by the read/write flip-flop 19*b*. The WDS signal is produced by flip-flop 69. The WDE signal is supplied by inverter 72. The input signals to inverter 72, which will ultimately produce signal WDS, are provided by gates 51 or 56, respectively.

As noted supra, gate 51 produces a signal only upon the concurrent and simultaneous application of signals which are indicative of one condition of all the flip-flops 19. On the other hand, gate 56 produces a signal only upon the concurrent application of the RD signal and the UP signal. It is clear that gates 51 and 56 will produce signals at different times. For example, gate 56 produces a signal only when the RD signal is supplied thereto while gate 51 produces a signal only when it receives, inter alia, the $\overline{RD}$ signal.

The stepping clock 71 is shown as flip-flop element. The stepping clock 71 may be any typical bistable element such as a multivibrator which provides a pulse-type signal, as well as the complement thereof. One of the signals, CK is applied, via gate 65, to the D/A select circuit 66 and the related multiplexing network. These signals control the operation of analog output devices 218. Additionally, for operational purposes, the feedback signals FBP are produced in accordance with the conditions at the analog output devices 218. Ultimately, the FBP signals are applied to flip-flops 19 (as the CDP signals) along line 73 which constitutes one input to gate 18′. The operation of this portion of the feedback network of the D/A converter is more fully described in the copending application of William H. Groth, entitled Electrical Apparatus, bearing Ser. No. 496,995, filed on Oct. 18, 1965, and assigned to a common assignee.

Clock 71 is a free running clock which is capable of supplying signals to the counter 107. Therefore, the clamping signal provided by gate 70 selectively inhibits the stepping function of clock source 71. More particularly, the output signal $\overline{CK}$ is applied to one input of gate 74. Another input to gate 74 is the $\overline{RD}$ signal. Gate 75 has applied thereto input signals RD and FBP. The outputs of gates 74 and 75 are connected together (in OR gate fashion) at an input to inverter network 76. The signal produced by inverter 76 is the CDP signal which is supplied as an input to gate 18′. For completeness, it is noted that unclamping the CK output of stepping clock 71 (for example by applying $\overline{RD}$, WDE and WDS to gate 70) is effective to produce the $\overline{CK}$ signals. The $\overline{CK}$ and $\overline{RD}$ signals are simultaneously applied to an enable gate 74. Thus, during the mode of operation wherein the CDP signals are desirable for writing into counter 107, clock 71 is enabled such that $\overline{CK}$ signals are generated. FBP signals are generated only in response to a control signal which is selectively provided by the feedback control circuit (FIGURE 4A) and in the absence of the $\overline{RD}$ signal.

Referring to FIGURE 4A, there is shown a schematic diagram of another portion of the circuit which interconnects with the circuitry shown in FIGURE 4 as indicated in the block diagram of FIGURE 5. More particularly, the free-running clock source 200 produces a high frequency output signal, for example on the order of one megacycle per second. The invention is not to be limited by the frequency suggested, and the actual application of the circuit is determinative of the output frequency. For example, if the device recited herein is utilized in an analog-type supervisory system as suggested in the aforesaid copending application of William H. Groth, a high frequency clock signal is desirable in order to reduce the ripple content of the analog output signal. Clock 200 may be any type of generator which produces a signal output CL and, preferably, the complement thereto. However, as suggested in the drawing, clock 200 may produce the output CL which is fed to an inverter 201 whereby the complement signal $\overline{CL}$ is produced. The signal CL is also supplied to a reference counter 202. Reference counter 202 may be any typical type of counter means, for example including a plurality of flip-flops, which are utilized to count the clock pulses. In one embodiment, the reference counter counts 1,024 clock pulses and supplies an output for each complete count. The signals supplied by the reference counter 202 are applied to period counter 203. Period counter 203 is designed to provide an output signal of a first level for a predetermined number of periods as counted by the reference counter. For example, period counter 203 may comprise five toggle flip-flop stages which are arranged to produce a sixteen period counter. The first level output signal (labelled E) produced by period counter 203 is supplied as an input to gate 204. This input signal is also supplied to inputs of gates 206 and 207. A second level output (labelled $\overline{E}$) of period counter 203 is applied to an input of gate 208. Also, supplied as inputs to gate 204 are the outputs from the reference counter 202, the complement clock signal $\overline{CL}$ and an output signal $\overline{A}$ produced by flip-flop 210 of the SYNC circuitry. Gate 204 produces an output signal upon the concurrent application of signals by each of the sources noted.

The output signal from gate 204 is supplied to D/A gating control circuit 217. Control circuit 217 may include gates (see FIGURE 6) which are selectively enabled in order to effect a feedback connection with the D/A converters in the converter bank 205. That is, the multiplexing circuitry selects the D/A converter and the gates in control circuit 217 are enabled when signals are simultaneously applied by a converter and gate 204. The output of control circuit 217 is connected to the input of frequency divider 212. Frequency divider 212 may also comprise a plurality of toggle flip-flops, for example four, which are utilized to divide the frequency of the signals applied to control circuits 217 via converter bank 205. That is, the number of signals supplied to network 217 comprises the signals produced by reference counter 202 during a predetermined duration (which number is equivalent to the number of pulses per period) times the number of periods which is determined by period counter 203. Since frequency divider 212 divides by a number equal to the number of periods counted by counter 203, the output of frequency divider 212 is equivalent to the average number of pulses per period. The output signal from frequency divider 212 is applied to gate 213. The signal supplied by gate 213 is applied to inverter 214. The output signal FBP, i.e. the feedback pulses, produced by inverter 214 is applied to the input of gate 75 as shown in FIGURE 4.

The SYNC network (FIGURE 4A) receives the output signals produced by the period counter 203 as noted supra. In addition, the SYNC network receives the signal REI from inverter 64 (FIGURE 4). These input signals are operated upon by the SYNC network to produce the PIM control signal hereinafter defined. Signal REI is applied as an input to gate 209. The output of gate 209 is applied to the Reset input of flip-flop 211. The signal REI is also supplied to inverter 215 to produce signal $\overline{REI}$. The $\overline{REI}$ signal is supplied as one input to gate 206 along with the first (i.e. E) level output produced by period counter 203 and the reset output signal $\overline{B}$ produced by flip-flop 211.

The concurrent application of the aforementioned signals to the gate 206 produces a signal which sets flip-flop 210 thereby producing the output signal A. The output signal A is applied to another input of gate 208. When the signal A is applied to gate 208 in conjunction with the second level (i.e. $\overline{E}$) signal produced by period counter 203, gate 208 produces a signal which sets flip-flop 211 thereby producing the output signal B. The output signal B is applied as an input signal to gates 207 and 216. Gate 207 produces an output signal when the aforesaid first level signal is produced by period counter 203 concurrently with the signal B. When gate 207 produces an output signal, flip-flop 210 is switched to the Reset condition thereby producing the output signal $\overline{A}$.

The signal $\overline{A}$ is the SYNC signal which is applied to gate 204 as noted supra and is required to enable this gate. The signals $\overline{A}$ and B are applied to gate 216 and will produce the signal PIM when simultaneously applied. The PIM signal is applied to one input of each of gates 50 as shown in FIGURE 4. The PIM signal is schematically represented as the signal produced by driver 16 in FIGURE 2 and inhibits diodes 13 thereof. That is, diodes 13 are reverse biased by the PIM signal. In addition, referring to FIGURE 4, the PIM signal is applied to inverter 77. The output of inverter 77 is applied to an input of gate 78. Also supplied to an input of the gate 78 is the WDE signal supplied by inverter 72. Gate 78 produces an output signal upon the concurrent application of the input signals thereto thereby indicating to the digital computer 79 that a control function which is produced by the digital computer may be undertaken. Such a control function may be the evaluation of information supplied by the core buffer and updating thereof for reinsertion into the core buffer for application to an analog output control element.

Figure 6:
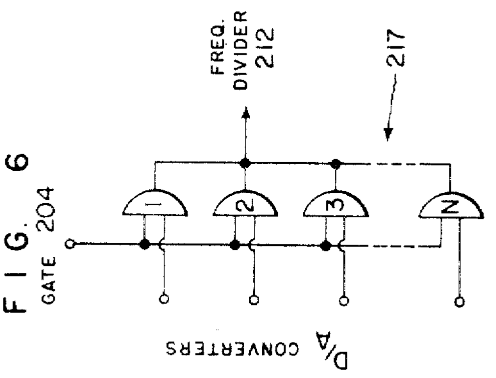
FIGURE 6 is a schematic diagram of one portion of the circuit.

Referring now to FIGURE 6, there is shown a typical arrangement of the gating networks described relative to D/A gating network 217. A plurality of gates 1, 2, 3 . . . N are shown. Each of the gates has one input which is connected in parallel to the output of gate 204 in FIGURE 4A. In addition, each of the aforesaid gates has another input which is individually connected to the D/A converters which make up D/A converter bank 205. The outputs of the N gates are connected together and applied to the input of frequency divider 212. Thus, it is seen that a signal is supplied by the individual D/A converter which has been selected in D/A converter bank 205. Since only one converter is selected, only one of the N gates receives an input from the converter bank. The application of a signal by gate 204 is applied to the inputs of each of the gates. Only that gate which experiences a simultaneity of input signals is enabled. The output signal from the enabled gate is applied, via the connection noted, to the frequency divider 212. Although other gating schemes are known, the recited technique is a preferred embodiment.

In the operation of the circuit described and shown primarily in FIGURES 4 and 4A, there are "read" and "write" modes of operation. In the write mode, which is described initially, the core buffer counter 107 (which comprises flip-flops 19) is initially loaded from the "magnetic coupler" or core buffer 100 which comprises the cores 1–4. That is, in the operation of these devices, input information is supplied to the cores by the data input devices 5 in conjunction with signals supplied by inhibit drivers 42 and 45. This information is retained in the cores as a form of temporary storage and is ultimately stored in flip-flops 19 in response to the drive and redrive signals supplied on lines 41 and 48. Consequently, it is obvious that this information is ultimately stored in the core buffer counter 107.

Similarly, the particular D/A converter in the D/A converter bank 205 is selected by the control operation. For example, the select control element 68 which may comprise a plurality of magnetic cores, applies signals representative of the core conditions to D/A select (switching) device 67 which may comprise a plurality of flip-flops. Upon the setting of at least one of these flip-flops, a signal is applied to the D/A select (logic) device 66 which may comprise a plurality of gates similar to the arrangement of gate 217 shown in FIGURE 6. The signals supplied to logic network 66 by circuit 67 and gate 65 produce an output signal by device 66 which is supplied to the D/A converter bank 205. Thus, the desired D/A converter is selected.

The inertial stepping clock 71 then decrements the core buffer counter while transmitting the same clock pulses to the selected D/A converter. That is, clock 71 supplies clock pulses CK via OR gate 65 to the selected D/A converter. At the same time, the complementary clock signal $\overline{CK}$ is supplied as an input to AND gate 74 along with the $\overline{RD}$ signal. This combination of signals selectively enables gate 74 whereby pulses are supplied to inverter 76. Inverter 76 inverts the signals supplied thereto whereby the CDP signals and the CK signals are in phase. The CDP signals are supplied via conductor 73 to an input of gate 18′ which supplies a toggle input to the associated flip-flop. The clock signals are continuously applied to the core buffer counter flip-flops until the counter reaches its zero state. When the counter reaches the zero state, each of the flip-flops produces a high level at the Reset side thereof. These signals are all applied to gate 51 in conjunction with the $\overline{RD}$ signal which is supplied by read/write flip-flop **19*b*. The application of all high level input signals to gate 51 produces a high level output signal therefrom. The output signal produced by gate 51 is inverted by inverter 72 and applied as the WDE input to gate 70 as well as to the clear terminal of flip-flop 69. The low level signals supplied to gate 70 cause the production of a low level output signal which, effectively, clamps the CK signal to ground. This operation serves to clamp the $\overline{CK}$ signal and, thereby, inhibits any clock action. It is obvious that the clock signals, which are supplied to the D/A converter, cause the converter to produce an analog signal which is supplied to any typical analog device represented by analog outputs 218**.

In the *read* mode of operation, a different technique is utilized. In this mode, the core buffer counter 107 is initially preset such that all of the flip-flops indicate or store binary ones therein. That is, each of the flip-flops 19 are switched to the Set condition. This condition of the flip-flops causes the clamping or inhibiting of the clock 71 whereby signals therefrom are not inserted via gate 65 into the D/A circuitry. The clamping effect is produced inasmuch as gate 70 produces a low level output signal (e.g. ground potential) in response to the low level $\overline{RD}$ signal. The low level $\overline{RD}$ signal is generated since the circuit is operating in the WRITE mode.

Additionally, flip-flop 69 is set by means of an associated core to produce the WDS signal which is applied to gates 70 and 63. Concurrently, flip-flop **19*b* is set by an associated core to produce the RD signal which is also supplied to gates 63 and 70. The combination of RD and WDS signals at gate 63 produces a signal which is inverted by inverter 64** to produce the output signal REI. The REI signal is applied to the SYNC circuitry shown in FIGURE 4A.

Utilizing the D/A selection network as noted supra, the associated core in select control apparatus 68 produces an output signal from D/A select network 67 and D/A select network 66. Consequently, a signal D/A converter in D/A converter bank 205 is selected. This converter produces a signal which is indicative of the condition of the analog output device 218. The signal from the D/A converter is applied via D/A gating network 217 to the feedback circuitry which is described in the aforementioned patent application of W. H. Groth.

It is seen, that the clock 200 provides the signal CL. The signal CL is applied to reference counter 202 and to the D/A converter bank 205. As is described in the aforementioned copending application, this clock signal is utilized to provide updating and similar functions. The CL signal is applied to one input of gate 204 and produces a signal to the D/A gating network 217.

Another signal supplied to gate 204 is supplied by period counter 203 which is driven by outputs from reference counter 202. Similarly, the output signal from reference counter 202 is applied as an input to gate 204. The other input signal to gate 204 is applied by the SYNC circuitry. Thus, it is seen that the SYNC circuitry and the feedback circuitry are interrelated. Furthermore, the operation of the feedback circuitry is operative to produce, via gate 213 and inverter 214, the feedback signals FBP which are applied to the core buffer counter (FIG. 4) via gate 75 and inverter 76. The feedback pulses are essentially generated by the clock 200 and operated upon by reference counter 202 and period counter 203.

Figure 7:
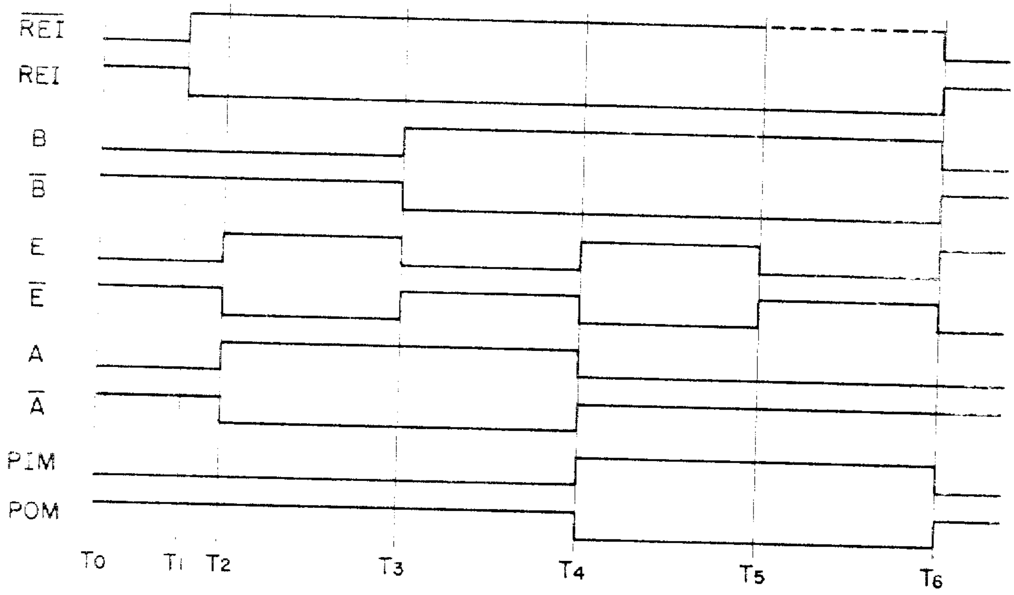
FIGURE 7 is a timing diagram for one portion of the circuit.

Period counter 203 exhibits different level signals E and $\overline{E}$ at the different outputs thereof in accordance with the period which is being counted. The E signals are applied to gates 206 and 207 to selectively control the output signals A and $\overline{A}$ from the flip-flop 210. The $\overline{E}$ signal is supplied to gate 208 to effect the B and $\overline{B}$ signals from flip-flop 211. The operation of the circuitry is better understood by referring to the timing diagram shown in FIG. 7. At time period T0, the signals are produced as shown. At time period T1, the $\overline{REI}$ signal switches from the low to the high state. Conversely, the REI signal switches from the high to the low state. However, the switching of these signals causes no further change in the SYNC circuitry inasmuch as the flip-flops are "positive going signal" operated circuits. At time period T2, the periodic signals E and $\overline{E}$ change states from the low to the high and from the high to the low levels, respectively. These signals change states periodically inasmuch as the period counter 203 periodically completes a full count of a predetermined value of each signal CL. At time period T2, the output signals A and $\overline{A}$ of flip-flop 210 switch to the high and low levels, respectively. That is, the signals $\overline{REI}$, $\overline{B}$ and E are all high level signals which produce a high level signal at the Set input of flip-flop A. Thus, flip-flop 210 produces a high level A signal output.

At time period T3, the E and $\overline{E}$ signals switch to the low and high states, respectively, inasmuch as the predeterminated period has been counted by counter 203. Thus, the A and $\overline{E}$ signals are high level signals and are supplied to gate 208. A high level signal is, thus, applied to the Set input of flip-flop 211 thereby producing a high level B output signal.

At time period T4, the periodic signals E and $\overline{E}$ produced by counter 203 again alter their levels. In addition, output signal B is a high level signal, also. Thus, gate 207 produces a high level reset signal which produces a high level Reset output signal $\overline{A}$ from flip-flop 210.

The combination of a positive input Reset signal and the lack of the sustaining positive Set signal causes the Set signal A to switch to the low level. Similarly, at time period T5, the high level $\overline{A}$ signal and the high level B signal are applied to the inputs of gate 216. The application of two high level signals thereto produces a high level output signal from gate 216. This output signal is labelled PIM and is representative of the parallel input mode.

At time period T5 the E and $\overline{E}$ signals switch. However, these signals cause no further alteration in the output signals produced by the circuit.

At time period T6, the REI and $\overline{\text{REI}}$ signal switch levels. The REI signal causes flip-flop 211 to produce the Reset output signal $\overline{\text{B}}$ whereby the PIM signal is terminated. That is, the Set signal B is terminated and gate 216 is rendered nonconductive. It will be seen that the PIM signal is representative of the completion of the READ cycle within the digital feedback circuitry. The PIM signal is applied to the core buffer and associated gating circuitry which places this portion of the circuit in the parallel input mode.

In the parallel input mode, the binary stages of the counter control the information stored therein. That is, referring now to FIGURE 2, the driver 16 normally shunts to ground via rectifier diodes 13 the current supplied by source 11 through resistors 12. In addition, the Zener diodes 9 normally decouple the inhibit current produced by source 11 from the winding 7 and associated circuitry. The shunting and decoupling of the inhibit current supplied by source 11 permits a Set pulse to appear on any of the inhibited cores 1–4. However, in the parallel input mode, the PIM signal is applied via driver 16 and reverse biases each of the rectifier diodes 13. Thus, the current supplied by source 11 is not shunted thereby. Consequently, the condition or state of the counter flip-flops determines the operation of the associated cores. For example, if a flip-flop 19 is in the Reset condition, a high level Reset output signal is supplied. This signal reverse biases the associated diode 14 whereby inhibit current produced by source 11 via resistor 12 is supplied by diode 10 through Zener diode 9 and thereby inhibits the associated core. Conversely, if the associated flip-flop 19 is in the Set condition, the Reset output signal is a low level signal whereby the associated diode 14 is forward biased. Consequently, the inhibit current produced by source 11 via resistor 12 is shunted to ground via diode 14. It will be seen that with the occurrence of a Set pulse due to the drive and redrive cycles, the Set pulse will be applied to the flip-flop only in the absence of an inhibit signal in the core. Thus, because of an inhibit current, a flip-flop which is in the Reset condition cannot be improperly switched to the Set condition since a Set input signal will not be applied. On those flip-flops which are in the Set condition, a Set input signal can be supplied but will cause no change in the condition thereof. Consequently, it is seen that this circuitry permits the selective shunting of the inhibit current whereby the condition of the individual flip-flops in the core buffer counter determines the status of the cores whereby the binary stages control their own status. Thus, this invention permits a magnetic core-buffer array to operate as both an input and an output transfer device.

The embodiments of the invention in which an exclusive property or privilege is claimed are defined as follows:

1. An input/output device comprising, a first plurality of bistable devices, a second plurality of bistable devices, means interconnecting said first and second pluralities of bistable devices to provide interrelated control of the bistable devices in each of said first and second pluralities, first control means connected to said first plurality of bistable devices to affect the operating state thereof, second control means connected to said second plurality of bistable devices to affect the operating state thereof, and third control means connected to both of said pluralities of bistable devices to affect the interrelated control between the first and second pluralities of bistable devices and the transfer of signals therebetween.

2. The input/output device recited in claim 1 wherein said first plurality of bistable devices comprises a plurality of magnetic elements, said second plurality of bistable devices comprises a plurality of solid state flip-flops, each of said magnetic elements being linked by at least one conductor.

3. The input/output device recited in claim 2 wherein said first control means comprises a plurality of drive means, said drive means being connected to said magnetic elements by means of a plurality of conductors, said second control means comprises at least one signal supplying means and a plurality of gates, one of said gates being connected between adjacent ones of said solid state flip-flops, each of said gates being controlled by at least two inputs at least one of which comprises an output from the preceding flip-flops.

4. The input/output device recited in claim 1 wherein said first plurality of bistable devices includes a plurality of magnetic cores exhibiting a substantially rectangular hysteresis characteristic, said second plurality of bistable devices comprises a plurality of semiconductor flip-flops, means for selectively inhibiting said flip-flops, means for selectively switching said magnetic cores from one stable state to another, coupling means connecting each magnetic core to an associated flip-flop respectively, means for selectively decoupling said coupling means whereby said cores and associated flip-flops are disconnected to the extent that the state of the flip-flops cannot be changed by action of the associated cores, input means connected to said magnetic cores for temporarily storing information in the cores, and output means connected to said magnetic cores for receiving information from said magnetic cores.

5. The input/output device recited in claim 4 wherein said coupling means comprises a plurality of unilaterally conducting means, reference source means connected to said coupling means, winding means linking said magnetic core and connected to said coupling means, an output from said flip-flops connected to said coupling means, said means for decoupling comprising signal supplying means connected to said coupling means such that said reference source means is selectively coupled to said winding means via at least one of said unilaterally conducting means.

6. The input/output device recited in claim 1 wherein said first plurality of bistable devices comprises a plurality of magnetic cores, said first control means comprises a plurality of signal supplying means for selectively driving and inhibiting said cores in a predetermined sequence, input means for selectively applying a signal to said cores, output means for receiving signals from said cores, said second plurality of bistable devices comprising a plurality of flip-flops, separate gate means connected to an input of each of said flip-flops, said second control means including signal supplying means connected to one input of each of said gates, pulse supplying means connected to one input of the first gate which is connected to an input of the first flip-flops, utilization means connected to an output of the last of said flip-flops, each of said flip-flops except said last flip-flop having the output connected to an input of the gate means connected to the input of the succeeding flip-flop, separate winding means coupled to each of said cores, said third control means comprising a plurality of diode means, first diode means connected between said winding means on a core and an input at the associated flip-flop, second diode means connected between said winding means on a core and an output at the associated flip-flop, reference source means connected to said second diode means, and drain means connected to said second diode means for selectively providing a drain to said reference source means whereby said reference source means does not supply a signal to said winding means.

7. The input/output device recited in claim 6 wherein said flip-flops have toggle inputs connected to said gates, said plurality of flip-flops and gates are connected in cascade to form counter means, feedback means selectively supplying signals to said pulse supplying means, clock source means selectively supplying signals to said pulse supplying means, said counter means counting the pulses supplied by said pulse supplying means, and control means for selecting which of said feedback means and said clock source means provide the signals to said pulse supplying means.

8. A switching circuit comprising, first bistable means, second bistable means, a first plurality of signal supplying means linked to said first bistable means to determine the operating state thereof, a second plurality of signal supplying means linked to said second bistable means to determine the operating states thereof, coupling means connected between said first and second bistable means, reference source means connected to said coupling means, and means for selectively shunting said reference source means in order to remove the effect of the reference source means from the coupling means.

References Cited

UNITED STATES PATENTS

| | | | |
|---|---|---|---|
| 2,951,233 | 8/1960 | Tanco et al. | 340—172.5 |
| 3,026,037 | 3/1962 | Foin et al. | 235—157 |
| 3,048,827 | 8/1962 | Wright et al. | 340—174 |

PAUL J. HENON, *Primary Examiner.*

RAULFE B. ZACHE, *Assistant Examiner.*